Figure 1:
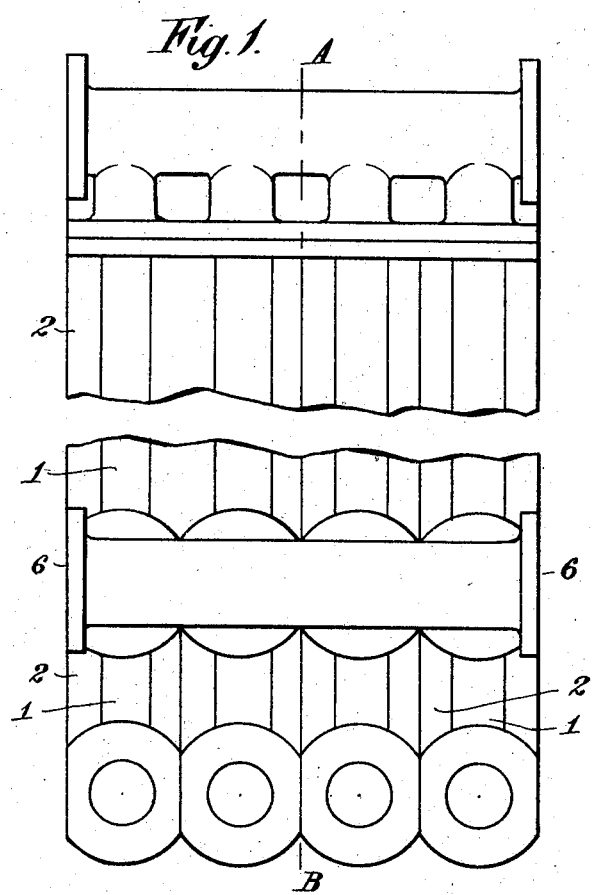

No. 768,043. PATENTED AUG. 23, 1904.
E. GREEN.
FUEL ECONOMIZER.
APPLICATION FILED JULY 17, 1903.
NO MODEL. 8 SHEETS—SHEET 1.

Witnesses:
Thos. J. Byrnes
A. S. Dunham

Edward Green, Inventor
by Kerr, Page & Cooper Att'ys

No. 768,043. PATENTED AUG. 23, 1904.
E. GREEN.
FUEL ECONOMIZER.
APPLICATION FILED JULY 17, 1903.
NO MODEL. 8 SHEETS—SHEET 4.
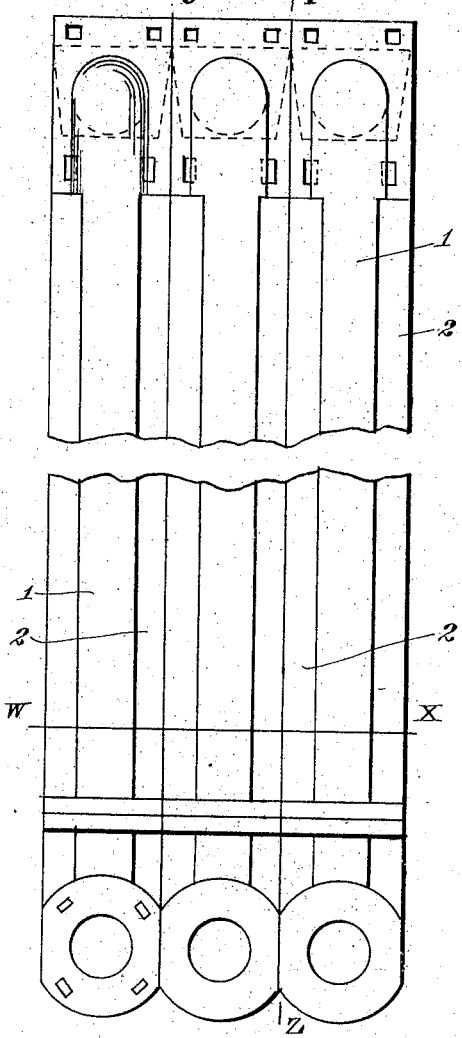
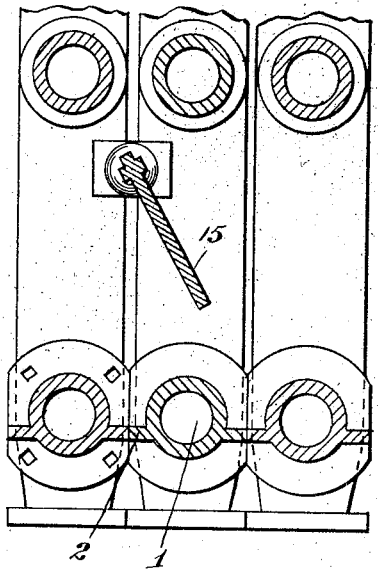
Witnesses: Edward Green, Inventor
Thos. J. Byrnes
A. S. Dunham by Kerr, Page & Cooper Att'ys

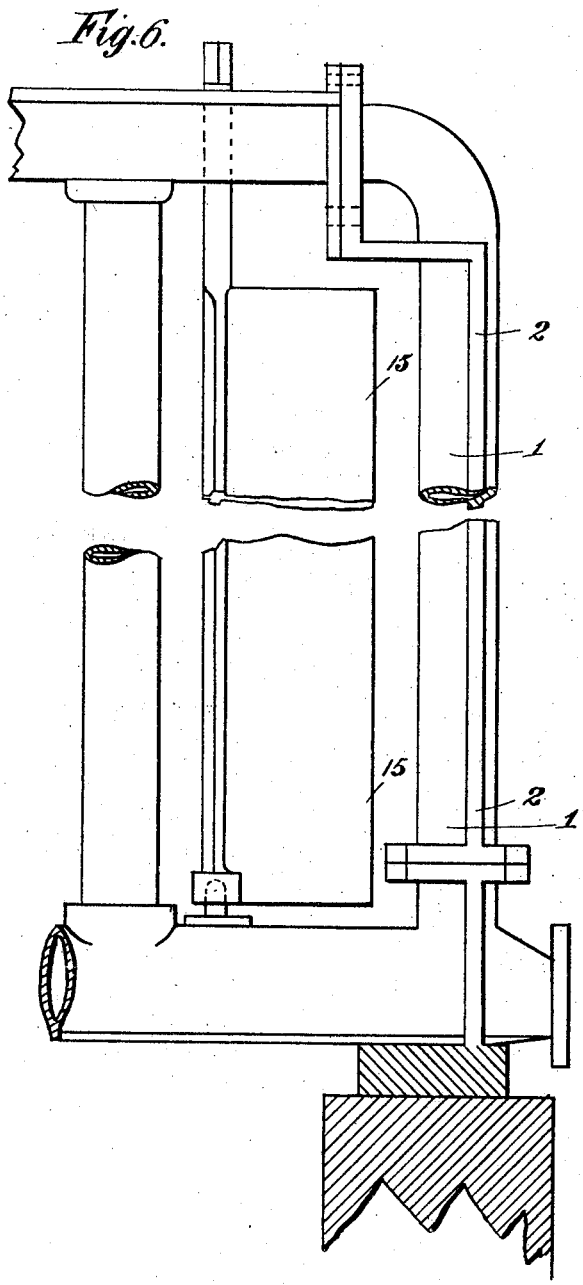

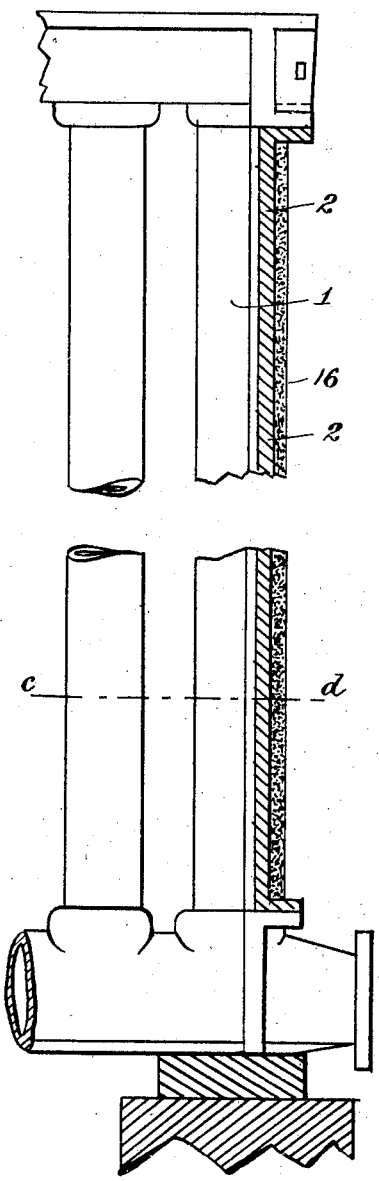
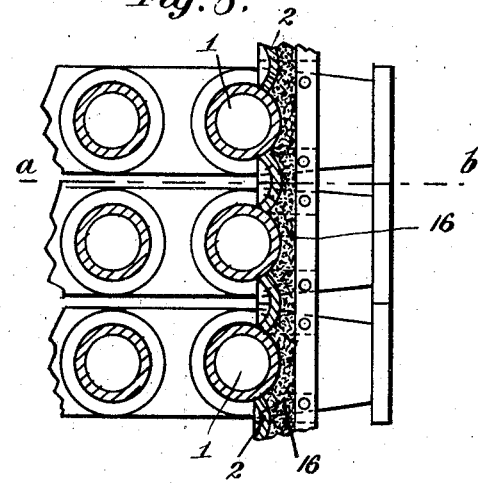

No. 768,043. PATENTED AUG. 23, 1904.
E. GREEN.
FUEL ECONOMIZER.
APPLICATION FILED JULY 17, 1903.
NO MODEL. 8 SHEETS—SHEET 7.

Witnesses: Edward Green, Inventor
Thos. J. Byrnes.
D. S. Dunham by Kerr, Page & Cooper Attys

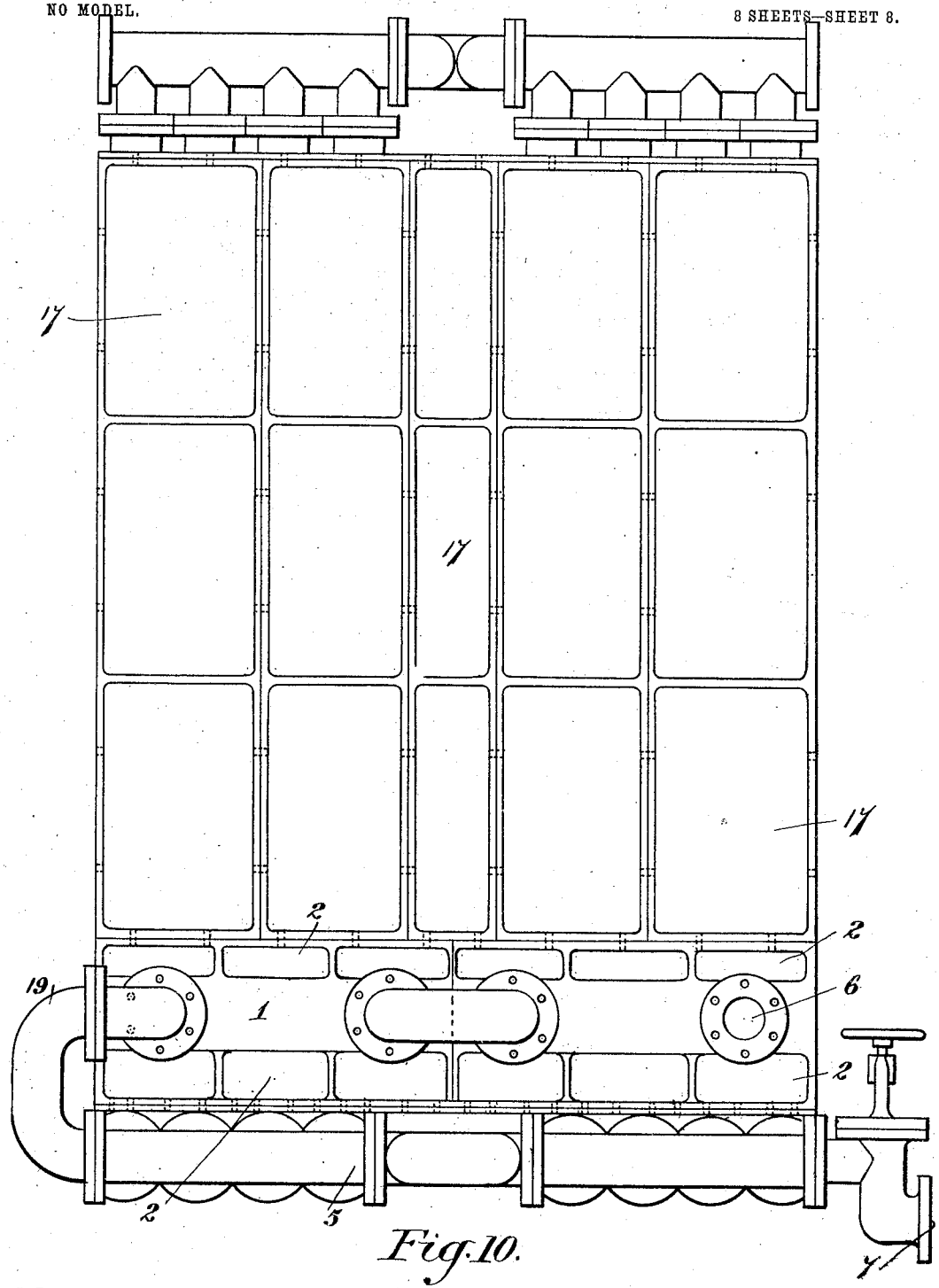

No. 768,043.　　　　　　　　　　　　　　　　　　　　　Patented August 23, 1904.

UNITED STATES PATENT OFFICE.

EDWARD GREEN, OF WAKEFIELD, ENGLAND.

FUEL-ECONOMIZER.

SPECIFICATION forming part of Letters Patent No. 768,043, dated August 23, 1904.

Application filed July 17, 1903. Serial No. 165,934. (No model.)

*To all whom it may concern:*

Be it known that I, EDWARD GREEN, baronet, a subject of the King of Great Britain, residing at Wakefield, Yorkshire, England, have invented certain new and useful Improvements in Fuel-Economizers for Steam-Boilers, of which the following is a specification.

The object of this invention is to provide a water wall or walls to fuel-economizers that the feed-water can have the chill taken off or be slightly warmed before entering the fuel-economizer proper, so that the life of a fuel-economizer is prolonged besides having additional temperature given to the water in the economizer by reason of the feed-water entering in a warmed state instead of cold, as is usual.

According to my invention I form the wall or walls of water-pipes so arranged that they are adjoining one another in an air and smoke tight manner, and the feed-water is passed through these pipes, so that such feed-water shall be warmed before entering the fuel-economizer proper. The pipes may be provided with webs cast on them, which webs abut against each other to form the air and smoke tight wall, and such webs may be placed in any position on the pipes, or the pipes may be shaped to fit side by side in an air and smoke tight manner, or if the pipes be at a distance apart the spaces between may be filled in with filling-in pieces to form an air and smoke tight wall, in which case the pieces can be removed for inspection without interfering with the pipes, and such wall or webs or filling-in pieces may be lagged to preserve and retain the heat and also assist in forming the air and smoke tight wall.

In some cases I may use deflectors, arranged within the economizer and so placed that some of the heated products of combustion coming from the furnace can be directed upon the wall to further assist in rapidly warming the incoming feed-water.

The water-wall may be attachable to the present construction of fuel-economizer or may be part of a fuel-economizer, and the water may be turned off from the wall by means of valves and the feed-water taken direct to the economizer. The wall may be provided with top and bottom boxes.

The accompanying drawings indicate several methods of carrying my invention into effect; but it must be understood that other methods than those set forth may be employed to form my water-wall.

Figure 2:
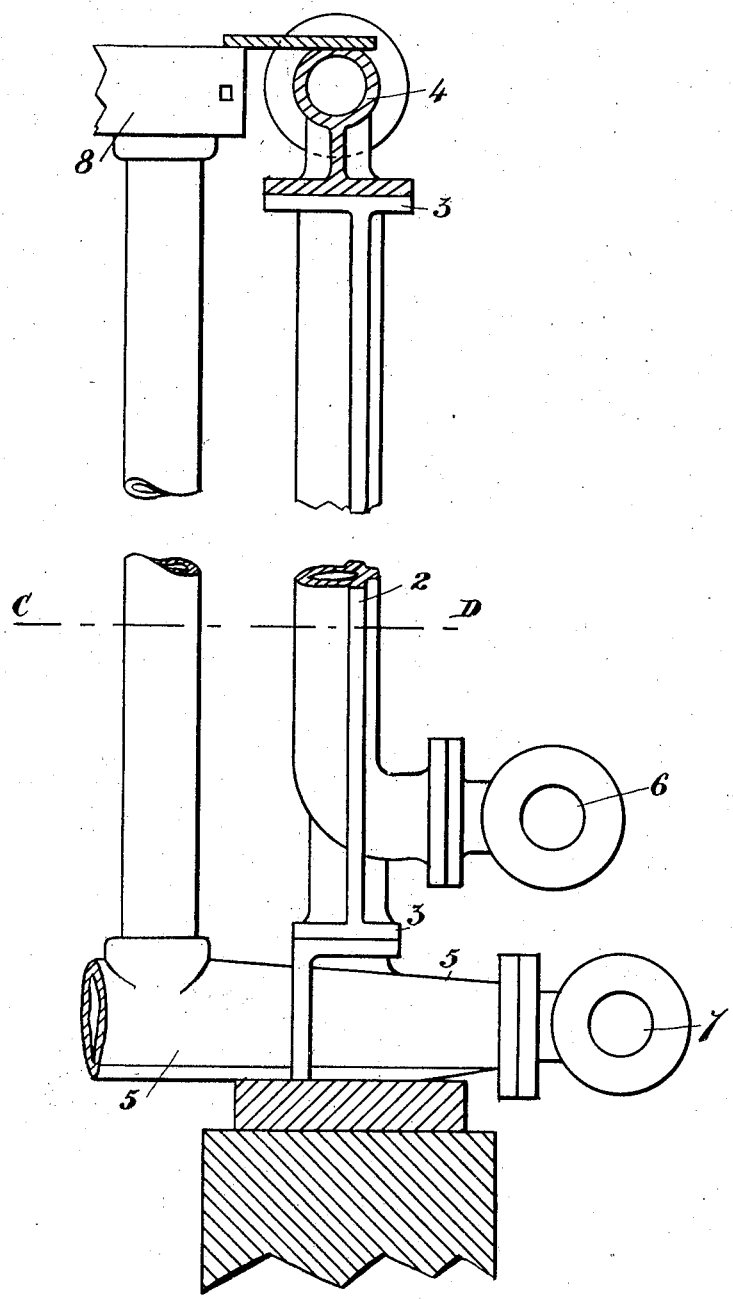
Figure 3:
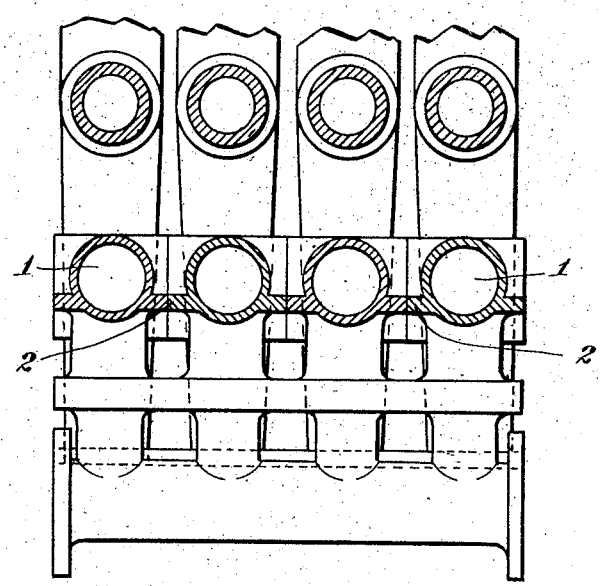
Figure 9:
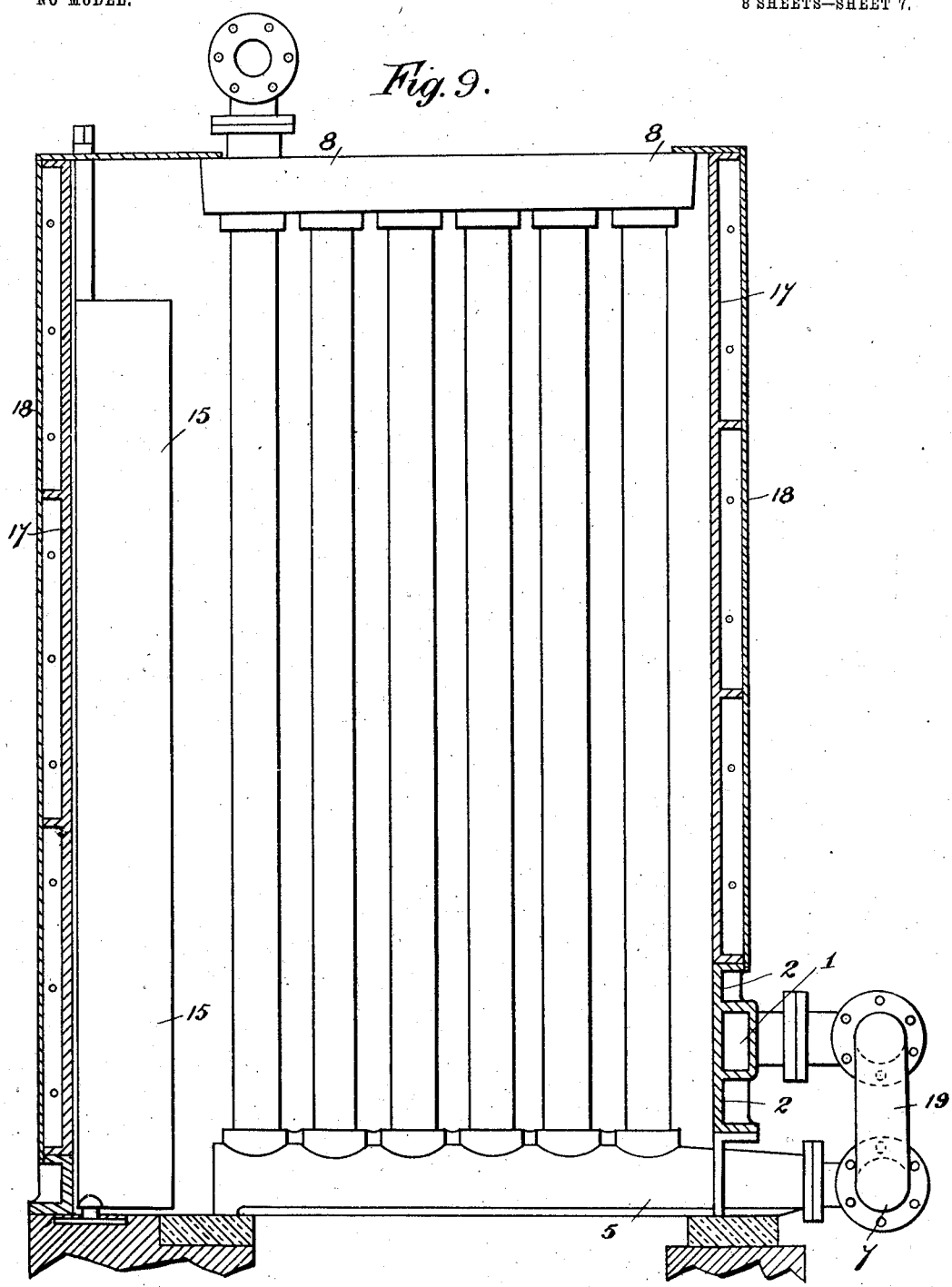

Figure 1 is a front elevation, Fig. 2 a cross-section on the line A B of Fig. 1, and Fig. 3 a sectional plan on the lines C D of Fig. 2, these showing sufficient of one method of carrying out my invention. Fig. 4 shows in elevation a similar embodiment. Figs. 5 and 6 are sections on lines W X and V Z, respectively, of Fig. 4, showing deflectors for throwing the heated products of combustion against the water-wall. Fig. 7 is a sectional elevation showing another embodiment of my invention. Figs. 8 and 9 are sections on lines $a\ b$ and $c\ d$, respectively, of Fig. 7. Fig. 9 is a sectional view illustrating another form, and Fig. 10 is an elevation of the same with the lagging removed.

The pipes 1, forming the wall of the economizer, have cast upon them flanges or webs 2 along each side of the pipes 1 and with webs 3 at top and bottom, so that when the edges of the webs 2 and 3 are placed together they can be fitted snug and closely to each other and form an air and smoke tight wall, the flanges or webs 3 being secured to the top water-wall branch pipe 4 and bottom box 5 of the economizer by bolts. In this construction the feed-water enters the bottom water-wall branch pipe 6 and passes up the water-pipes 1, forming the water-wall, to be warmed before entering the bottom box branch pipe 7 of the fuel-economizer proper.

In Figs. 4, 5, and 6 I show a construction in which a deflector or deflectors, as 15, are employed to throw the passing products of combustion against the water-wall. By this means greater heat is imparted to the same, and the temperature of the feed-water is raised still higher before entering the economizer proper.

In all the previous figures the webs have been cast or formed on the pipes to form the air and smoke tight wall; but at Fig. 7, a sectional elevation on the line $a\,b$, and Fig. 8, a sectional plan on the line $c\,d$ of Fig. 7, I show the webs 2 as separate articles and fitted in place between the pipes, and I prefer in this construction, and in which the water-wall is part of the fuel-economizer proper, to cover the pipes and filling-in pieces 2 on the outside with a heat-resisting composition 16, or in some cases I may employ asbestos packing and retain same in place against a plain wall 17 by a sheet-iron lagging 18, as will be understood by reference to Fig. 9, which is a cross-section of a fuel-economizer, and Fig. 10, which is an elevation with the lagging removed. In this construction the water-wall is formed at the lower part and consists of a horizontal pipe 1, having webs 2 connected at the top with the wall and at the lower part to flange formed on the bottom boxes 5, the feed-water traveling along the pipes 1 before entering the pipes 7, connecting the bottom boxes 5. The water-wall is cast in segments and connected up by bends 19.

What I claim, and desire to secure by Letters Patent, is—

1. The combination with a fuel-economizer, of a substantially air and smoke tight water-wall in communication with said economizer, as set forth.

2. The combination with a fuel-economizer, of a water-wall in communication with the economizer, composed of a plurality of intercommunicating pipes, and webs between said pipes whereby the wall is rendered substantially air and smoke tight, as set forth.

3. The combination with a fuel-economizer, of a water-wall in communication therewith, composed of a plurality of intercommunicating pipes having integral webs thereon, whereby the wall is rendered substantially air and smoke tight, as set forth.

In testimony whereof I have hereunto set my hand in presence of two subscribing witnesses.

EDWARD GREEN.

Witnesses:
  PERCY E. MATTOCKS,
  FRED. C. SMITH.